(12) United States Patent
Throop et al.

(10) Patent No.: US 9,330,009 B1
(45) Date of Patent: May 3, 2016

(54) MANAGING DATA STORAGE

(75) Inventors: Dean D. Throop, Efland, NC (US);
Dennis T. Duprey, Raleigh, NC (US);
Miles de Forest, Durham, NC (US);
Michael D. Haynes, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/340,912

(22) Filed: Dec. 30, 2011

Related U.S. Application Data (63) Continuation-in-part of application No. 13/159,780, filed on Jun. 14, 2011.

(51) Int. Cl.
| | | |
|---|---|---|
| G06F 12/00 | (2006.01) | |
| G06F 13/00 | (2006.01) | |
| G06F 13/28 | (2006.01) | |
| G06F 12/08 | (2016.01) | |

(52) U.S. Cl.
CPC .................. G06F 12/0866 (2013.01)

(58) Field of Classification Search
CPC .......... G06F 17/30221; G06F 17/30575; G06F 17/30082; G06F 17/30159; G06F 11/1448; G06F 11/1464; G06F 11/1412
USPC .......................................... 711/117
See application file for complete search history.

(56) References Cited

U.S. PATENT DOCUMENTS

| | | | | |
|---|---|---|---|---|
| 5,659,713 A * | 8/1997 | Goodwin et al. | | 711/157 |
| 7,124,272 B1 * | 10/2006 | Kennedy | G06F 3/0613 | 711/173 |
| 7,949,637 B1 * | 5/2011 | Burke | | 707/655 |
| 8,380,928 B1 * | 2/2013 | Chen | G06F 3/061 | 711/117 |
| 8,429,346 B1 * | 4/2013 | Chen | G06F 3/0689 | 709/213 |
| 8,443,157 B1 * | 5/2013 | Reiner | G06F 3/0605 | 711/154 |
| 8,473,678 B1 * | 6/2013 | Rajasekaran | G06F 3/0605 | 711/114 |
| 8,478,731 B1 * | 7/2013 | Throop | G06F 17/30153 | 707/693 |
| 8,510,528 B2 * | 8/2013 | Rubio et al. | | 711/165 |
| 2004/0230764 A1 * | 11/2004 | Merchant | G06F 3/0608 | 711/173 |
| 2009/0043978 A1 * | 2/2009 | Sawdon et al. | | 711/162 |
| 2009/0113112 A1 * | 4/2009 | Ye | G06F 12/0246 | 711/102 |
| 2009/0150593 A1 * | 6/2009 | Hamilton | G06F 3/061 | 711/101 |
| 2010/0281230 A1 * | 11/2010 | Rabii | G06F 3/0605 | 711/165 |
| 2011/0035548 A1 * | 2/2011 | Kimmel | G06F 3/061 | 711/114 |
| 2011/0106862 A1 * | 5/2011 | Mamidi | G06F 17/30221 | 707/823 |
| 2011/0106863 A1 * | 5/2011 | Mamidi | G06F 17/30221 | 707/823 |

(Continued)

*Primary Examiner* — Sheng-Jen Tsai
(74) *Attorney, Agent, or Firm* — Krishnendu Gupta; Jason A. Reyes (57) ABSTRACT

A method and system for use in managing data storage is disclosed. Data storage in a data storage system is managed. The data storage system comprises a first data storage tier and a second data storage tier configured such that the performance characteristics associated with one of the data storage tiers is superior to the other data storage tier. I/O activity is determined in connection with a data group stored on one of the first and second data storage tiers. It is determined whether to migrate the data group stored on the one of the first and second data storage tiers to the other data storage tier based on the performance characteristics associated with the other data storage tier and the determined I/O activity. The data group is migrated to the other data storage tier in response to determining to migrate the data group to the other data storage tier. The data group is processed in response to determining to migrate the data group to the other data storage tier such that fragmentation in connection with the data group is substantially reduced.

20 Claims, 5 Drawing Sheets

(56) References Cited

U.S. PATENT DOCUMENTS

| | | | |
|---|---|---|---|
| 2011/0167217 A1* | 7/2011 | Montgomery | G06F 3/0613 711/114 |
| 2011/0202732 A1* | 8/2011 | Montgomery | G06F 3/061 711/154 |
| 2011/0320754 A1* | 12/2011 | Ichikawa et al. | 711/165 |
| 2012/0036327 A1* | 2/2012 | Jennas, II | G06F 3/0613 711/137 |
| 2012/0173831 A1* | 7/2012 | Rubio | G06F 3/0605 711/165 |
| 2012/0239859 A1* | 9/2012 | Lary | G06F 3/061 711/103 |
| 2012/0296883 A1* | 11/2012 | Ganesh | G06F 17/30315 707/693 |
| 2012/0317337 A1* | 12/2012 | Johar | G06F 12/0246 711/103 |
| 2013/0173856 A1* | 7/2013 | Ye | G06F 12/0246 711/103 |

\* cited by examiner

MANAGING DATA STORAGE

RELATED APPLICATION

This application is a continuation-in-part application claiming priority to co-pending U.S. patent application Ser. No. 13/159,780, filed Jun. 14, 2011, reference no. EMC-10-019, entitled "MANAGING TIERING IN CACHE-BASED SYSTEMS", the entirety of which patent application is hereby incorporated by reference herein.

TECHNICAL FIELD

The invention relates to managing data storage.

BACKGROUND OF THE INVENTION

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such as the number of data transfer buses available in the system and the density of traffic on each bus.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

The Storage Array keeps track of the logical unit to physical unit association in a map. The map associates a host logical unit address with a physical device address. The size of the elements in the map is the coarseness of the map. A map that only has a few entries of large extents is a course grain map. A map that has many entries with small extents is a fine grain map. Fine grain map allow more flexibility but generally are too large for all of it to be contained in memory at once. It is possible to use different mapping granularities for different data to achieve a variety of space/performance trade-offs.

SUMMARY OF THE INVENTION

A method and system for use in managing data storage is disclosed. Data storage in a data storage system is managed. The data storage system comprises a first data storage tier and a second data storage tier configured such that the performance characteristics associated with one of the data storage tiers is superior to the other data storage tier. I/O activity is determined in connection with a data group stored on one of the first and second data storage tiers. It is determined whether to migrate the data group stored on the one of the first and second data storage tiers to the other data storage tier based on the performance characteristics associated with the other data storage tier and the determined I/O activity. The data group is migrated to the other data storage tier in response to determining to migrate the data group to the other data storage tier. The data group is processed in response to determining to migrate the data group to the other data storage tier such that fragmentation in connection with the data group is substantially reduced.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below is a technique for use in managing data storage. Data storage systems comprising disks may move data to different types of disks to balance data temperatures with disk capability. In accordance with the technique described herein, as part of moving data for tiering, the storage system may select a placement that will increase the sequential arrangement of the data on the disks.

Conventionally, tiering systems move data to the first free space found in the desired tier. This can cause a logical unit to develop a random arrangement of data extents. By considering the ordering of the extents on the disk as part of relocations, the technique described herein can increase performance as part of moving data for tiering.

Figure 1:
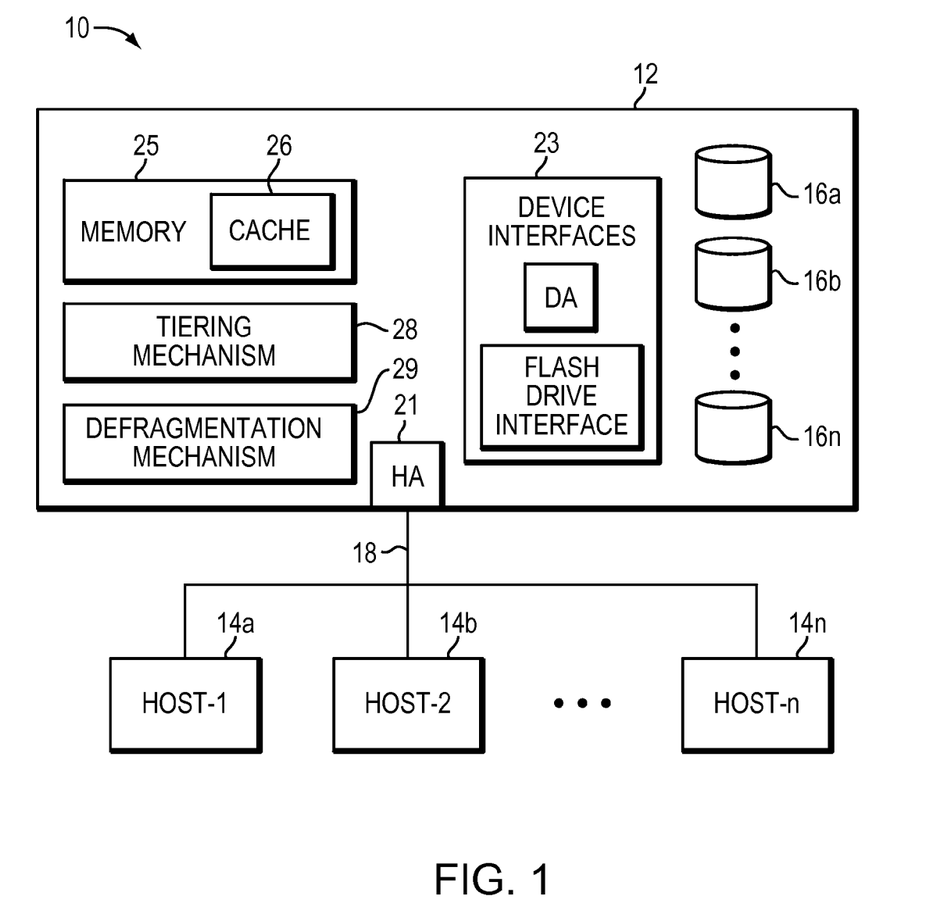
FIG. 1 is an example embodiment of a system that may utilize the technique described herein.

Referring to FIG. 1, there is illustrated an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not need to address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

The map associates logical addresses in the host visible LUs with the physical devices where the data is actually stored. The map also contains a list of unused slices on the physical devices that are candidates for use when LUs are created or when they expand. The map in some embodiments may also contain other information such as time last access for all or a subset of the slices or frequency counters for the slice; the time last access or frequency counters can be analyzed to derive temperature of the slices. This will be described further below.

The data storage system 12 in the embodiment of FIG. 1 further comprises a host adaptor (HA) 21 coupled to the hosts 14a-14n via the communication medium 18, device interfaces 23, memory 25, cache 26, and a tiering mechanism 28 for facilitating migration of a data group from one data storage tier to another data storage tier. The respective tiers may comprise storage devices with the same or similar characteristics grouped together such that the performance characteristics associated with one tier are superior to the other tier. The device interfaces 23 may comprise device adaptors and interfaces (e.g., a flash drive interface). Additionally, the cache 26 may be connectable to the device interfaces 23 if the cache utilizes flash drives in addition to memory.

The data storage system 12 in the embodiment of FIG. 1 also comprises a defragmentation mechanism 29 for defragmenting a data group and substantially reducing fragmentation in connection with a data group. In this embodiment, the mechanism 29 is configured for co-operating with the mechanism 28 for defragmenting a data group in response to the tiering mechanism 28 determining that the data group is to be migrated to another tier. In other words, the defragmenting process is performed together with migration of the data group to another tier. For example, a slice of data may be migrated to another tier and defragmented for substantially reducing fragmentation in connection with the slice. It will be appreciated that in one embodiment the mechanism 29 may process a slice such that data blocks called silvers (e.g., 8 KB blocks) in the slice can be moved around to improve sequential access and sequential access optimizations. Since the data is being migrated from one place to another it is preferable to look at the logical block addresses associated with the slivers and move them in such a fashion that the logical addresses which are sequential are written back using adjacent locations in the slice.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The disk devices may be any one or more different types of disk devices such as, for example, an ATA disk drive, FC disk drive, and the like. The flash devices may be constructed using different types of memory technologies such as non-volatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Thus, the storage system may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an I/O request. As mentioned above, and in accordance with an embodiment of the current technique, storage devices with the same or similar characteristics may be grouped into two or more tiers. For example, a group of solid state drives may comprise a fastest tier, a group of fast but small disks may comprise a fast tier, and a group of slow but large disks may comprise a slow tier. It should be noted that in addition to a storage tier, there may be a construct referred to as a storage pool. A storage pool ("pool") may be a reserve of storage devices that may be used, for example, to create LUs, as needed. A pool, as in the case of a storage tier, may be made up of devices with different performance and cost characteristics. Thus, devices within a pool may be grouped into two or more tiers. In some embodiments, each pool may itself represent a tier. In this embodiment, a pool may be made up of only storage devices with the same or similar characteristics.

In some embodiments, it may also be possible to bind or designate a set of data storage resources, such as logical and/or physical devices, a portion of cache 26, and services, such as a software vendor's service for providing data replication, to one or more of the tiers. The set of resources associated with or designated for use by a tier or grouping within a pool may be characterized as a dynamic binding in that the particular set of data storage system resources associated with a tier may vary from time to time. Also, the configuration for the data storage system, aspects of the current data storage system resources (e.g., types of devices, device storage capacity and physical device characteristics related to speed and time to access data stored on the device), and current workload and other dynamic aspects (e.g., actual observed performance and utilization metrics) of the data storage system, may also change over time.

Figure 2:
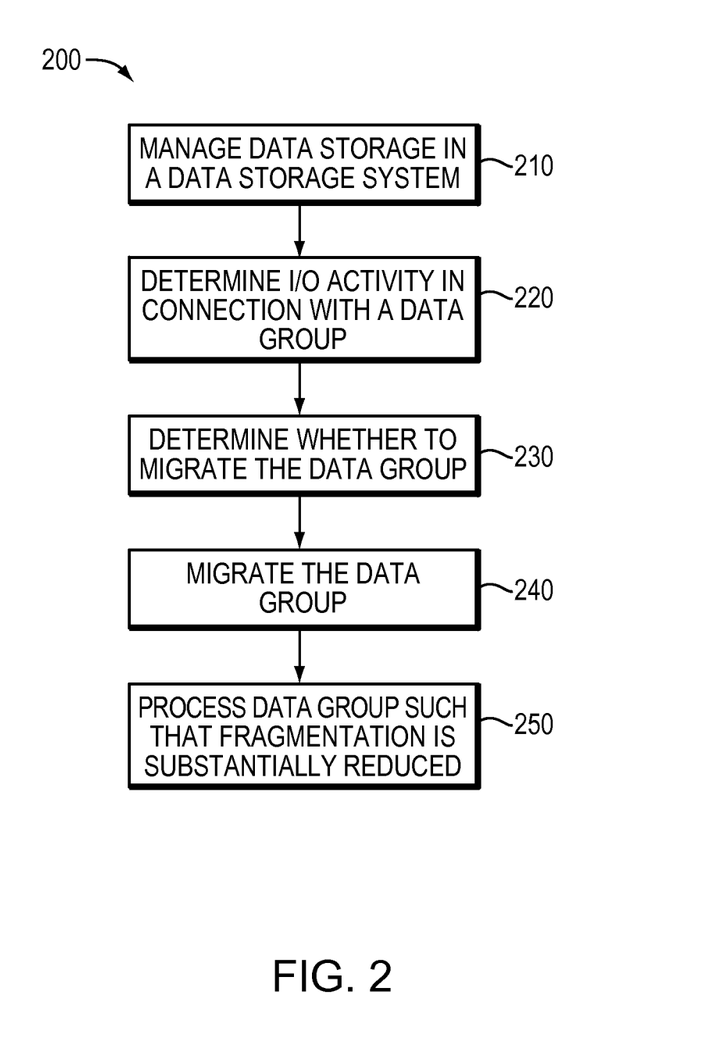
FIG. 2 is a flowchart of processing steps that may be performed in an embodiment in accordance with the technique described herein.

Referring to FIG. 2, there is illustrated a flowchart summarizing the steps of a technique 200 for managing data storage. It will be appreciated that the technique may be implemented in connection with the data storage system 12 of FIG. 1. The technique comprises managing 210 data storage in a data storage system comprising a first data storage tier and a second data storage tier configured such that the performance characteristics associated with one of the data storage tiers is superior to the other data storage tier. In one embodiment, the respective first and second data storage tiers comprise a plurality of similar data storage devices grouped together such that similar data storage devices in one of the first and second data storage tiers may have superior performance characteristics to the data storage devices in the other data storage tier. For example, the tiers may comprise disk drives of disparate performance characteristics. It will be appreciated that the data storage devices may be organized into one or more logical units (LUs). The technique comprises determining I/O activity 220 in connection with a data group stored on one of the first and second data storage tiers. It will be known in the art that determining the I/O activity of a data group may also be described as determining the temperature of the data group. In general, temperature may correspond to, for example, how often and how recently the data is accessed. For example, hot data may refer to data that has been accessed recently and is accessed often and cold data may refer to data that has not been accessed recently and is not accessed often. The technique comprises determining 230 whether to migrate the data group stored on the one of the first and second data storage tiers to the other data storage tier based on the performance characteristics associated with the other data storage tier and the determined I/O activity. In general, in accordance with an embodiment of the current technique, hot data is migrated to faster and typically more expensive storage and cool data is migrated to slower and typically less expensive storage. The technique comprises migrating 240 the data group to the other data storage tier in response to determining to migrate the data group to the other data storage tier. For example, the data group may be located on a slower or inferior performing tier and the determined I/O activity or temperature may be determined to be high or hot. In such a scenario, the technique may determine that the data group may be migrated to the superior performing tier. In some embodiments, data may be migrated among the tiers in "slices." A slice, for example, may be a logical grouping of data of a particular size, e.g., a one gigabyte slice of data. A slice may be comprised of smaller data blocks or units, or slivers, which may be, for example, an eight kilobyte sliver. For example, it will be appreciated that each logical unit may be subdivided into one or more slices (e.g., 1 gigabyte) and each slice divided into one or more slivers (e.g., 8 kilobyte blocks). It will also be appreciated that the tiering mechanism 28 may facilitate migration between tiers. This will be described in further detail below. The technique also comprises processing 250 the data group in response to determining to migrate the data group to the other data storage tier such that fragmentation in connection with the data group is substantially reduced. In one embodiment, the data group is processed such the logical addresses of at least some of the data blocks in the data group can be laid down sequentially in the other data storage tier. In one embodiment, the technique re-arranges the data blocks on disk drives so that the data blocks can be accessed with the fewest number of random seeks. For example, the defragmentation mechanism 29 may move the data blocks such that the blocks are on the same data track or in the same general region.

It will be appreciated by those skilled in the art that in certain situations there may be block sharing or sliver sharing. For example, in the situation of a snapshot, the technique may attempt to keep the source defragmented and then attempt to keep snap data defragmented as it will be appreciated that most users may care more about the performance of the source as opposed to the performance of the snaps of the source. Furthermore, in a de-duplication situation, the LUs sharing the same block are likely to have no derivation relationship as opposed to the situation of snapshots. In this case, the technique may present an interface to a storage administrator allowing the individual to select a preference to a particular LU in the same de-duplication domain as other LUs.

The technique as described above has many advantages. The technique by migrating the hottest, most accessed, data to the fastest storage and the coldest, least accessed, data to less expensive storage may provide better system performance and an improved total cost of ownership (TCO). Additionally, by using a variety of different devices the storage array can have a performance profile more like an array having only fast disks with a cost profile approaching an array having only slow disks without customers having to expend time to catagorize and manage tiers of storage. Furthermore, the technique increases the overall performance of the data storage system by defragmenting the data group in response to determining to migrate the data group. In particular, the technique improves the performance for sequential reads as the disk arm does not have to continuously move back and forth locating the data blocks.

Figure 3:
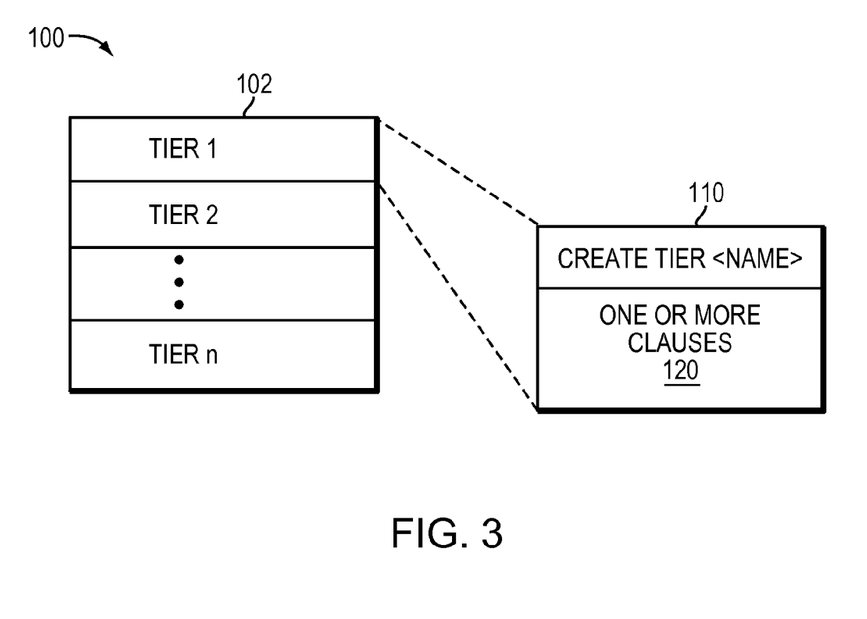
FIG. 3 is an example embodiment of storage tiering.

Referring to FIG. 3, there is illustrated an example embodiment of storage tiering. The example 100 includes a set of one or more tiers 102. Each tier, such as tier 1, may be created by specifying a tier definition 110. In at least one embodiment, the tier definition 110 may include one or more lines of text in a language which may be subsequently processed by code on the data storage system. The tier definition 110 defines a tier indicated by <NAME>. The tier definition may include one or more clauses 120. The clauses of 120 may include one or more goal clauses and/or one or more configuration clauses that represent tiering policies.

As described above, the temperature of data may be determined by analyzing how often that data is accessed, e.g., I/O access data statistics. For example, the temperature may be given by considering the number of times a data group, for example, a particular slice of data is accessed in a given second or it may correspond to the response time of the accesses to the data. Some embodiments may collect data only during time periods that are of particular interest, which may be determined based on host or storage system behavior. In some embodiments, data temperature may be determined by taking the average of the calculated temperatures over a given period of time or may be calculated using exponential decay. In at least one embodiment, the temperature of a slice may be designated as a scalar or step value, that is it may have a numerical equivalent such as 30 degrees or may simply be designated into a category, such as cold or hot. The temperature may also be relative. For example, slice temperature may be determined by comparing the access statistics for a slice in a tier to access statistics of other slices in the same tier.

In a specific embodiment, the tiering mechanism 28 may maintain information regarding to which tier a slice or sliver is associated and may also track and store access statistics for slivers and slices to determine a temperature of the slices. In at least one embodiment, the temperature for a given slice may be based on I/O activity associated with the slivers of that slice. Depending on the slice temperature, the slice may be a candidate for migration to a faster or slower tier by the tiering mechanism 28.

In some cases, slivers of a slice may be located in cache 26. Conventionally, access statistics (e.g., I/O activity data) associated with the cached slivers are not considered when calculating the temperature of the slice corresponding to the slivers. Consequently, the temperature of the slice may be distorted. For example, if cache 26 is handling a lot of I/O activity for slivers of a slice, the slice may appear colder than it would if the slivers were not being accessed from the cache.

In some embodiments in accordance with the current technique, the tiering mechanism 28 may consider access statistics associated with slivers of a slice located in cache 26. In these embodiments, cache 26, or another component such as tiering mechanism 28, may track and store access statistics for the cached slivers. The tiering mechanism 28 may then combine cached sliver statistics and the non-cached sliver statistics to determine whether a slice should be migrated to a faster tier. Thus, the current technique may help provide a more accurate slice temperature by coordinating cache and tier activity. In some embodiments, the current technique may also help free up space in cache 26 as the slivers may no longer be cached once the slice is migrated to a faster tier.

In at least some embodiments, the scheduled time to migrate a slice of data to a different tier may be used as a time to perform several actions on the data. For example, storage pools may be expanded and data re-distributed across the new pools; the data may be re-sequenced for sequential access (i.e., defragmentation); or the data may be examined for compression and/or de-duplication.

Figure 4:
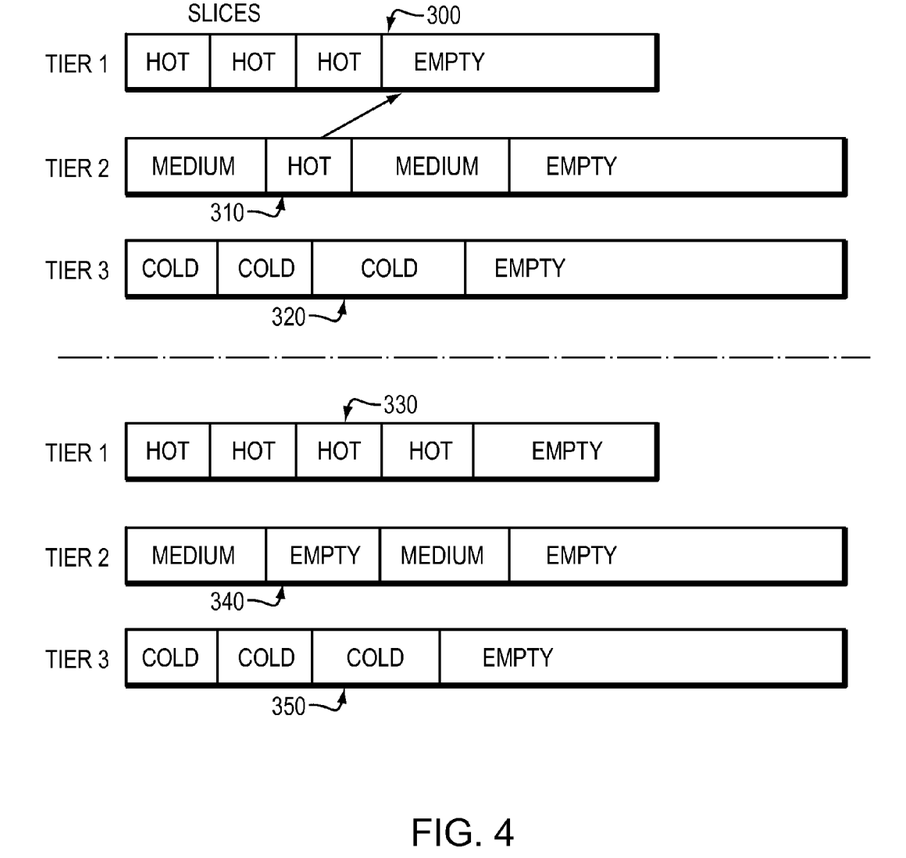
FIG. 4 is an example of a data group being migrated from one tier to another tier.

Referring now to FIG. 4, there is illustrated an example of a data group being migrated from one tier to another tier in accordance with the current technique. In this figure, there are three tiers, tier 1, tier 2 and tier 3. Each tier may be comprised of distinct storage devices or a group of similarly performing devices. For example, one of the tiers may comprise FC disk devices and another tier may comprise of SATA devices. Spread across the tiers are slices, such as slices 300, 310, and 320. Each slice may have a temperature associated with it such as hot, cold, or medium, as determined by the tiering mechanism 28. For example, slices 310 and 330 are hot, and slices 320 and 350 are cold. As well, as illustrated by spaces 300 and 340 in FIG. 4, each tier may have empty space, which may be used to store slices migrated to the tier.

In this example embodiment, tier 1 may have faster performance characteristics and a higher cost. Conversely, tier 2 may have slower performance characteristics but a lower cost. This may be realized, for example, by observing the fact that there is more storage space in tier 2 than there is in tier 1.

Referring to the upper portion of FIG. 4, it is shown that there is a hot slice 310 in tier 2 that can be moved to empty space 300 of tier 1, as determined by tiering mechanism 28. This determination may be based on slice access statistics for slivers of the slice alone or in combination with cache access statistics associated with slivers of the slice managed by the cache. In this example embodiment, as shown in the lower portion of FIG. 4, the hot slice is moved into the empty space of tier 1 leaving empty space 340 in tier 2. Additionally, in this embodiment of the invention, the temperature of the slice and the time of the migration can be captured and saved with the slice. This is advantageous insofar as when a future decision is taken as regards moving the slice it is possible to determine the change in temperature and amount of time the slice has been in the tier. Slices whose temperature have decreased relative to when they are moved into the tier may be better candidates to move out of the tier. Slices which have only been in a tier for a short time may not be good candidates to move to a lower tier.

It will also be appreciated from the disclosure herein that the hot slice may also be processed for substantially reducing fragmentation in connection with the slice in response to determining to migrate the hot slice to tier 1. It will be appreciated that any of a wide variety of defragmentation mechanisms can be used. It will also be appreciated that the hot slice may be processed such the logical addresses of at least some data blocks or slivers in the hot slice can be laid down sequentially in tier 1. For example, it will be appreciated that in the above example the technique may move the slivers and update the map so the logical addresses map to the new tier 1. The technique may move in slivers with sequential LBAs into tier 1. As it moves a sliver it can look to see if the LBA matches the next logical address LBA that goes in the slices and if the address does not match, the technique can either go get that sliver and write it to the next place in the tier 1 or it can leave a hole in tier 1 for later by writing the sliver to another place. That other place could be the correct position in tier 1 or it might start at the end of the slice and write the non-sequential slivers to the end. It may then work back from the end of the slice storing blocks with LBAs not in sequence for the slice. Later as it moves more slices from tier 2 to tier 1 the technique may locate some LBAs in slices that it could have used earlier and it can back write them in to the holes left earlier.

Figure 5:
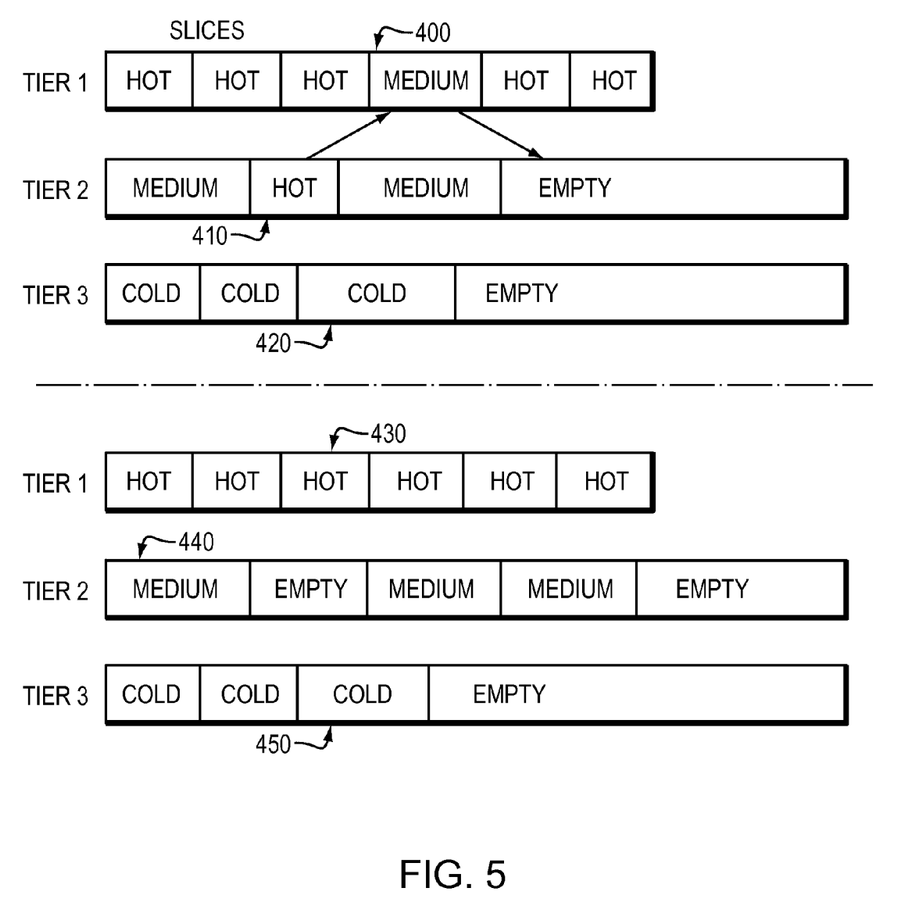
FIG. 5 is an alternative example of a data group being migrated from one tier to another tier.

Referring now to FIG. 5, there is illustrated another example of a data group being migrated from one tier to another tier in accordance with the current technique. In this figure, there are three tiers, tier 1, tier 2 and tier 3. Each tier may be comprised of distinct storage devices or a group of similarly performing devices. Spread across the tiers are slices. Each slice may have a temperature associated with it such as hot, cold, or medium, as determined by the tiering mechanism 28. For example, slices 410 and 430 are hot, slices 420 and 450 are cold and slices 400 and 440 are medium. In this embodiment, there is illustrated a hot slice 410 in tier 2 and medium slice 400 in tier 1. However, tier 1 does not have empty space in which to accommodate an additional slice. Therefore, in this embodiment, the medium slice 400 on tier 1 is migrated to tier 2 and the hot slice 410 in tier 2 is migrated to tier 1. It should be noted that it is the need to migrate the hot slice 410 to tier 1 that caused the medium slice 400 to be shifted to tier 2. In some embodiments, the tiering mechanism 28 may only migrate a slice if it is hotter than a slice in a higher tier. Also, in some embodiments, depending on the size of the slices to be migrated, the slices may swap tier locations; possibly with the use of temporary storage.

It will also be appreciated from the disclosure herein that the hot slice and medium slice may also be processed for substantially reducing fragmentation in connection with the slice in response to determining to migrate the hot slice to tier 1. The hot slice and medium slice may be processed such the logical addresses of at least some data blocks or slivers in the slices can be laid down sequentially in tiers 1 and 2, respectively.

In some embodiments, the tiering mechanism 28 and/or cache 26 may be tuned to help provide improved system performance. As one example, the tiering mechanism 28 or cache 26 may be tuned to consider access statistics for slivers located in the "shadow" of cache 26, or in other words, slivers that are being considered for inclusion in cache 26. As another example, the tiering mechanism 28 may be tuned to consider cache access statistics for only the slices that are of a certain temperature. For example, tiering mechanism 28 may not consider cache access statistics for cold slices. In this example, the cache access statistics for slivers associated with respective hot slices of a group of hot slices may be considered in determining which one or more of the slices in the group should be migrated to a faster tier. In these examples and the embodiments described above, the weight given to specific access statistics may also be tuned. For instance, access statistics for slivers in the cache shadow may be given less weight than access statistics for slivers in cache 26. And, access statistics for slivers in cache 26 may be given less weight than access statistics for slivers that have not been cached. In another embodiment the tiering mechanism 28 may be tuned so that the temperature of cold slices in a data storage device is changed to a higher temperature based on high data activity associated with slivers in the cache. Additionally, the tiering mechanism may be tuned to migrate the slice to a higher tier based on the number of hot slivers in a slice. Slices with more hot slivers are better candidates for migration to a higher tier than a slice with a small number of hot slivers. In other words, there are multiple ways to tune the tiering mechanism 28 and cache 26. It should be noted that tuning can be performed automatically by the storage system or by a user.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method for use in managing data storage, the method comprising:
    collecting cache activity data in connection with at least one data unit stored in cache in a data storage system, wherein the at least one data unit forms at least part of a data group;
    collecting non-cache activity data in connection with the data group stored on a first data storage tier in the data storage system, wherein the data storage system comprises first and second data storage tiers configured such that the performance characteristics associated with one of the data storage tiers is superior to the other data storage tier, further wherein the first and second data storage tiers are separate to the cache, still further wherein the data group is stored on the first data storage tier, additionally wherein the at least one data unit that forms at least part of the data group is stored in the cache;
    based on the cache activity data, the non-cache activity data, and the performance characteristics associated with the second data storage tier, determining whether to store the data group on the second data storage tier in the data storage system; and in response to determining to store the data group on the second data storage tier, performing operations relating to storage of the data group on the second data storage tier, including:

storing a first data unit of the data group on the second data storage tier;

determining that a second data unit of the data group should not be arranged next to the first data unit on the second data storage tier based on an address associated with the second data unit; and determining to leave a hole next to the first data unit on the second data storage tier by writing the second data unit to another place;

locating a third data unit in the data group or another data group, wherein the first and third data units have sequential addresses; and writing the third data unit to the hole next to the first data unit.

2. The method as claimed in claim 1, wherein the data group is processed such that the logical addresses of at least some of the data blocks in the data group can be laid down sequentially in the other data storage tier.

3. The method as claimed in claim 1, wherein the respective first and second data storage tiers comprise a plurality of similar data storage devices grouped together such that the performance characteristics associated with one of the data storage tiers is superior to the other data storage tier.

4. The method as claimed in claim 3, wherein the similar data storage devices in one of the first and second data storage tiers comprise superior performance characteristics to the data storage devices in the other data storage tier.

5. The method as claimed in claim 4, wherein the data storage devices comprise disk drives.

6. The method as claimed in claim 1, wherein the data group comprises a slice of data.

7. The method as claimed in claim 1, wherein the first and second data storage tiers are associated with defined I/O activity in connection with the data group.

8. The method as claimed in claim 7, wherein one of the first and second data storage tiers is associated with a high amount of I/O activity in connection with the data group.

9. The method as claimed in claim 8, wherein the other of the first and second data storage tiers is associated with a low amount of I/O activity in connection with the data group.

10. The method as claimed in claim 9, wherein the data group stored on the one of the first and second data storage tiers is migrated to the other data storage tier based on the determined I/O activity and the other tier being associated with the determined I/O activity.

11. A system for use in managing data storage, the system comprising:

first logic collecting cache activity data in connection with at least one data unit stored in cache in a data storage system, wherein the at least one data unit forms at least part of a data group;

second logic collecting non-cache activity data in connection with the data group stored on a first data storage tier in the data storage system, wherein the data storage system comprises first and second data storage tiers configured such that the performance characteristics associated with one of the data storage tiers is superior to the other data storage tier, further wherein the first and second data storage tiers are separate to the cache, still further wherein the data group is stored on the first data storage tier, additionally wherein the at least one data unit that forms at least part of the data group is stored in the cache;

based on the cache activity data, the non-cache activity data, and the performance characteristics associated with the second data storage tier, third logic determining whether to store the data group on the second data storage tier in the data storage system; and in response to determining to store the data group on the second data storage tier, fourth logic performing operations relating to storage of the data group on the second data storage tier, including:

storing a first data unit of the data group on the second data storage tier;

determining that a second data unit of the data group should not be arranged next to the first data unit on the second data storage tier based on an address associated with the second data unit; and determining to leave a hole next to the first data unit on the second data storage tier by writing the second data unit to another place;

locating a third data unit in the data group or another data group, wherein the first and third data units have sequential addresses; and writing the third data unit to the hole next to the first data unit.

12. The system as claimed in claim 11, wherein the data group is processed such that the logical addresses of at least some of the data blocks in the data group can be laid down sequentially in the other data storage tier.

13. The system as claimed in claim 11, wherein the respective first and second data storage tiers comprise a plurality of similar data storage devices grouped together such that the performance characteristics associated with one of the data storage tiers is superior to the other data storage tier.

14. The system as claimed in claim 13, wherein the similar data storage devices in one of the first and second data storage tiers comprise superior performance characteristics to the data storage devices in the other data storage tier.

15. The system as claimed in claim 14, wherein the data storage devices comprise disk drives.

16. The system as claimed in claim 11, wherein the data group comprises a slice of data.

17. The system as claimed in claim 11, wherein the first and second data storage tiers are associated with defined I/O activity in connection with the data group.

18. The system as claimed in claim 17, wherein one of the first and second data storage tiers is associated with a high amount of I/O activity in connection with the data group.

19. The system as claimed in claim 18, wherein the other of the first and second data storage tiers is associated with a low amount of I/O activity in connection with the data group.

20. The system as claimed in claim 19, wherein the data group stored on the one of the first and second data storage tiers is migrated to the other data storage tier based on the determined I/O activity and the other tier being associated with the determined I/O activity.

* * * * *